US012593228B2

(12) United States Patent
Duan et al.

(10) Patent No.: US 12,593,228 B2
(45) Date of Patent: Mar. 31, 2026

(54) OPPORTUNISTIC RF SENSING IN CELLULAR SYSTEMS

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 911 days.

(21) Appl. No.: 17/833,692

(22) Filed: Jun. 6, 2022

(65) Prior Publication Data

US 2023/0397025 A1 Dec. 7, 2023

(51) Int. Cl.
*H04W 24/08* (2009.01)
(52) U.S. Cl.
CPC ................................. *H04W 24/08* (2013.01)
(58) Field of Classification Search
CPC ....................................................... H04W 24/08
See application file for complete search history.

(56) References Cited

U.S. PATENT DOCUMENTS

| | | | | |
|---|---|---|---|---|
| 2014/0254415 A1* | 9/2014 | Chen | ................... | H04L 27/0006 |
| | | | | 370/252 |
| 2021/0226752 A1* | 7/2021 | Choi | ..................... | H04W 72/21 |
| 2023/0308157 A1* | 9/2023 | Bi | ...................... | H04B 7/06952 |
| 2023/0362898 A1* | 11/2023 | Jeon | ..................... | G01S 7/0235 |

FOREIGN PATENT DOCUMENTS

| | | | | |
|---|---|---|---|---|
| WO | WO-2021029814 A1 * | 2/2021 | ............ | H04W 36/06 |
| WO | 2022036541 A1 | 2/2022 | | |

OTHER PUBLICATIONS

International Search Report and Written Opinion—PCT/US2023/016796—ISA/EPO—Jul. 4, 2023.

* cited by examiner

*Primary Examiner* — Abdeltif Ajid
(74) *Attorney, Agent, or Firm* — Thien T. Nguyen

(57) ABSTRACT

Disclosed are techniques for radio frequency (RF) sensing. In an aspect, a network entity, such as a base station, may identify an opportunity for RF sensing during which a user equipment (UE) does not transmit signals, the opportunity comprising a guard period of the UE, a bandwidth part (BWP) switching period of the UE, or a beam switching period of the UE. The network entity may transmit an RF sensing signal, receive an RF sensing signal, or both, during the opportunity for RF sensing. In an aspect, a UE may determine an opportunity for a network entity to perform RF sensing while the UE does not transmit signals, the opportunity comprising a guard period of the UE, a BWP switching period of the UE, or a beam switching period of the UE. The UE may indicate, to the network entity, the opportunity for RF sensing.

25 Claims, 11 Drawing Sheets

400

406

402

408

404

Transmit and Receive

410

406

412

406

404

416

Transmit

414

Receive

OPPORTUNISTIC RF SENSING IN CELLULAR SYSTEMS

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of radio frequency (RF) sensing performed by a network entity, such as a base station (BS), includes identifying an opportunity for RF sensing during which a user equipment (UE) does not transmit signals, the opportunity comprising a guard period of the UE, a bandwidth part (BWP) switching period of the UE, or a beam switching period of the UE; and transmitting an RF sensing signal, receiving an RF sensing signal, or both, during the opportunity for RF sensing.

In an aspect, a method of RF sensing performed by a UE includes determining an opportunity for a base station to perform RF sensing while the UE does not transmit signals, the opportunity comprising a guard period of the UE, a BWP switching period of the UE, or a beam switching period of the UE; and indicating, to a base station, the opportunity for RF sensing.

In an aspect, a network entity includes a memory; at least one transceiver; and at least one processor communicatively coupled to the memory and the at least one transceiver, the at least one processor configured to: identify an opportunity for RF sensing during which a UE does not transmit signals, the opportunity comprising a guard period of the UE, a BWP switching period of the UE, or a beam switching period of the UE; and transmit, via the at least one transceiver, an RF sensing signal, receiving an RF sensing signal, or both, during the opportunity for RF sensing.

In an aspect, a UE includes a memory; at least one transceiver; and at least one processor communicatively coupled to the memory and the at least one transceiver, the at least one processor configured to: determine an opportunity for a base station to perform RF sensing while the UE does not transmit signals, the opportunity comprising a guard period of the UE, a BWP switching period of the UE, or a beam switching period of the UE; and indicate, to a base station via the at least one transceiver, the opportunity for RF sensing.

In an aspect, a base station includes means for identifying an opportunity for RF sensing during which a UE does not transmit signals, the opportunity comprising a guard period of the UE, a BWP switching period of the UE, or a beam switching period of the UE; and means for transmitting an RF sensing signal, receiving an RF sensing signal, or both, during the opportunity for RF sensing.

In an aspect, a UE includes means for determining an opportunity for a base station to perform RF sensing while the UE does not transmit signals, the opportunity comprising a guard period of the UE, a BWP switching period of the UE, or a beam switching period of the UE; and means for indicating, to a base station, the opportunity for RF sensing.

In an aspect, a non-transitory computer-readable medium storing computer-executable instructions that, when executed by a base station, cause the base station to: identify an opportunity for RF sensing during which a UE does not transmit signals, the opportunity comprising a guard period of the UE, a BWP switching period of the UE, or a beam switching period of the UE; and transmit an RF sensing signal, receiving an RF sensing signal, or both, during the opportunity for RF sensing.

In an aspect, a non-transitory computer-readable medium storing computer-executable instructions that, when executed by a UE, cause the UE to: determine an opportunity for a base station to perform RF sensing while the UE does not transmit signals, the opportunity comprising a guard period of the UE, a BWP switching period of the UE, or a beam switching period of the UE; and indicate, to a base station, the opportunity for RF sensing.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
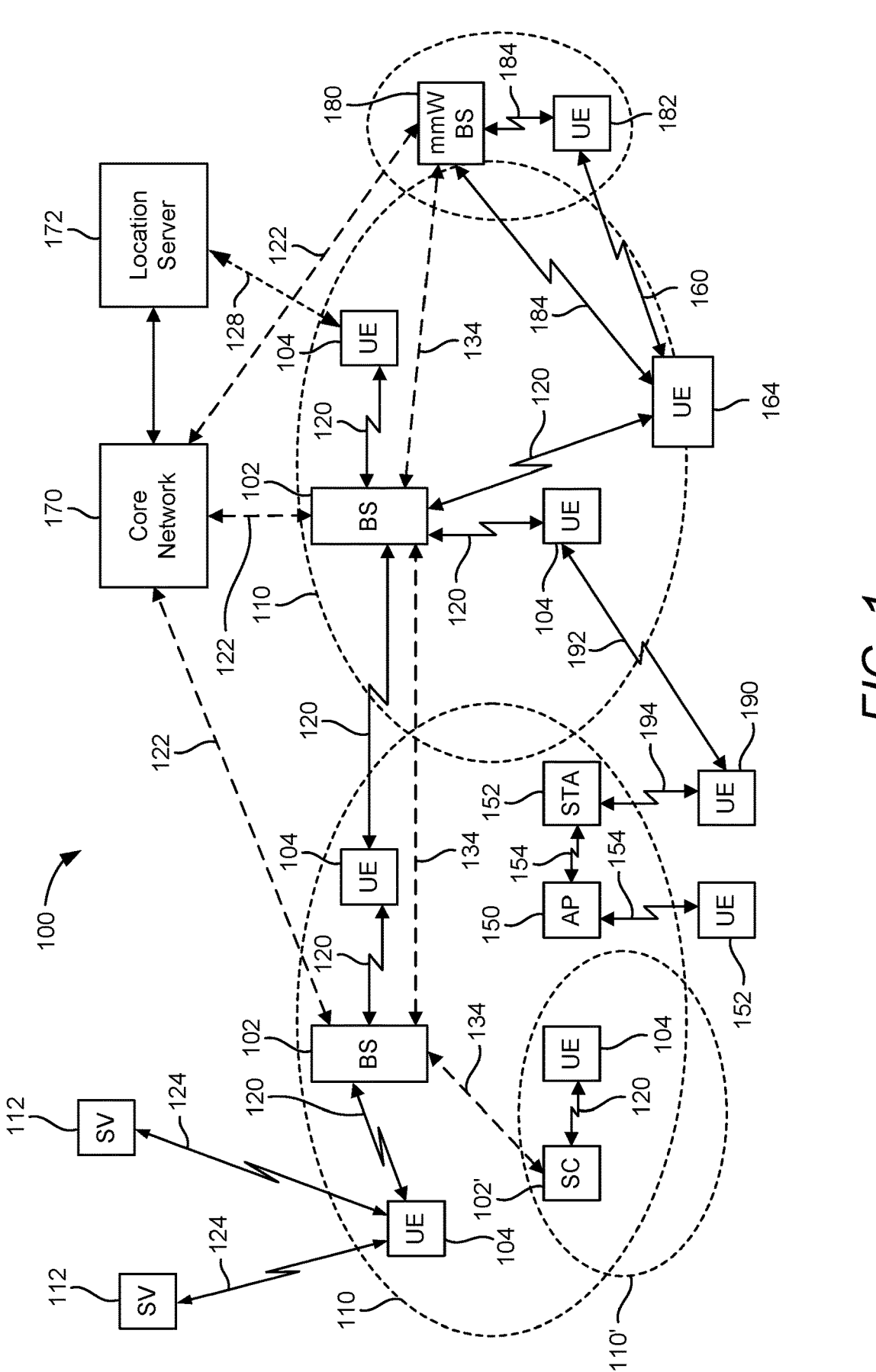
FIG. 1 illustrates an example wireless communications system, according to aspects of the disclosure.

Disclosed are techniques for radio frequency (RF) sensing. In an aspect, a network entity, such as a base station, may identify an opportunity for RF sensing during which a user equipment (UE) does not transmit signals, the opportunity comprising a guard period of the UE, a bandwidth part (BWP) switching period of the UE, or a beam switching period of the UE. The network entity may transmit an RF sensing signal, receive an RF sensing signal, or both, during the opportunity for RF sensing. In an aspect, a UE may determine an opportunity for a network entity to perform RF sensing while the UE does not transmit signals, the opportunity comprising a guard period of the UE, a BWP switching period of the UE, or a beam switching period of the UE. The UE may indicate, to a network entity, the opportunity for RF sensing.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
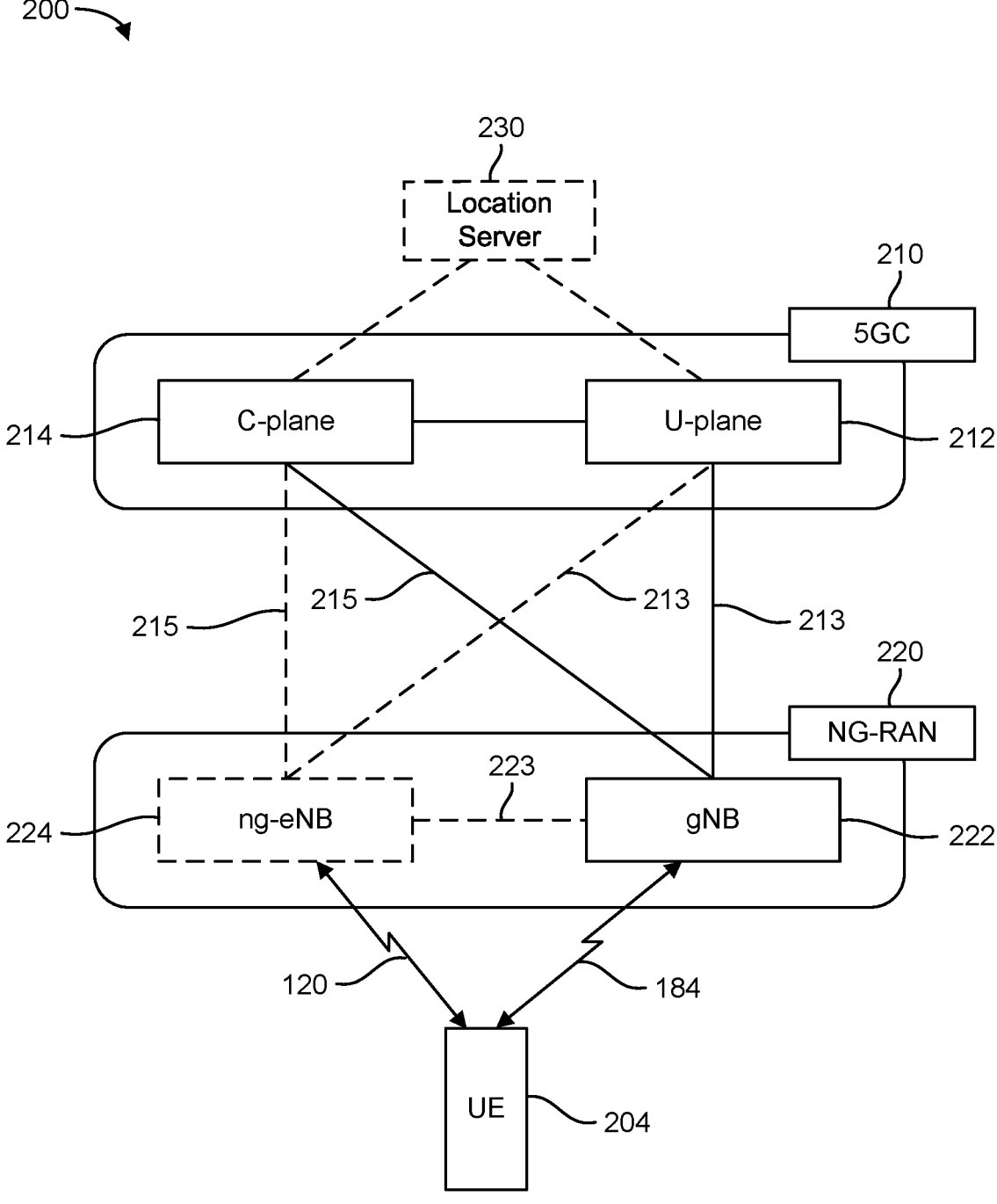
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
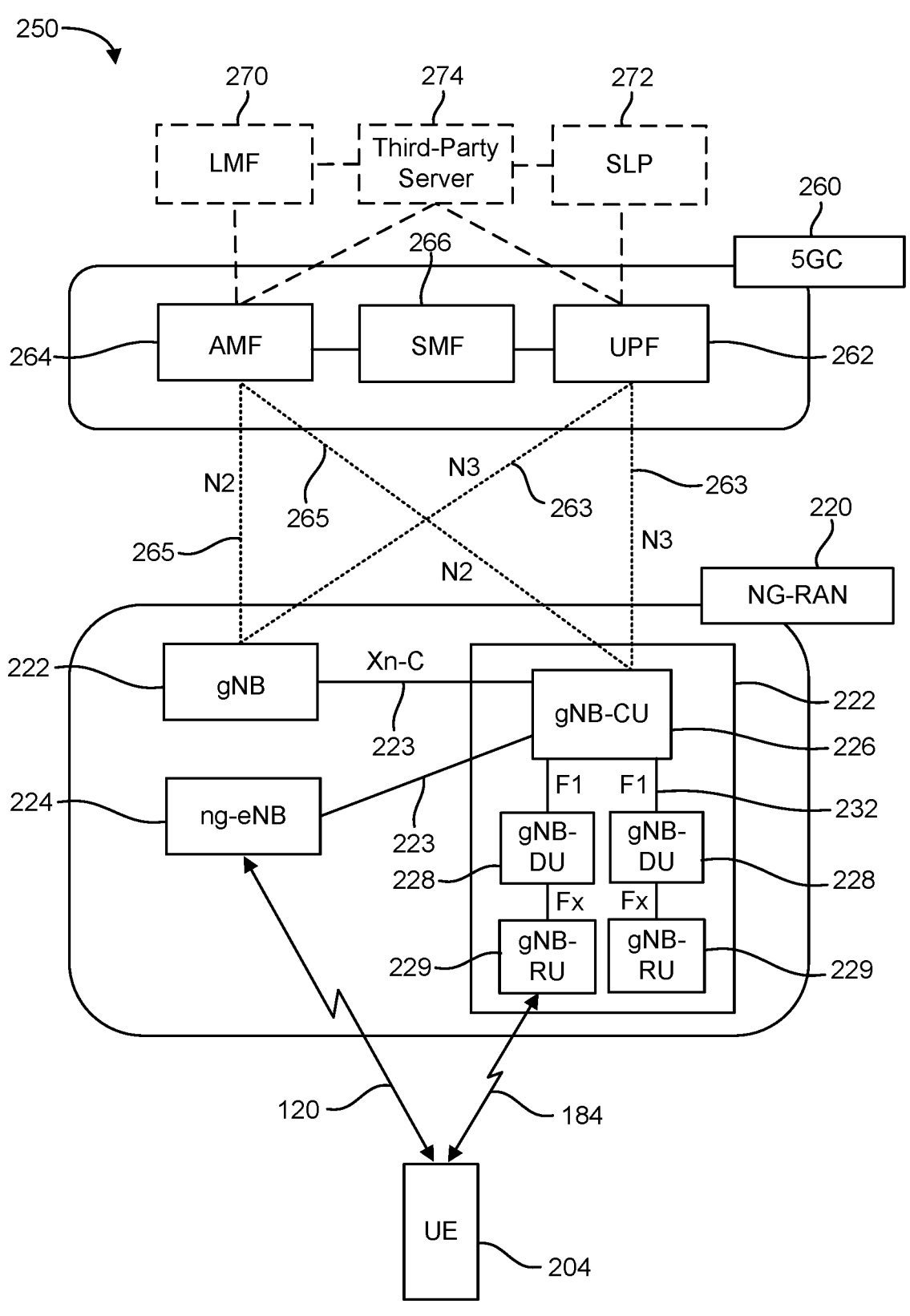

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
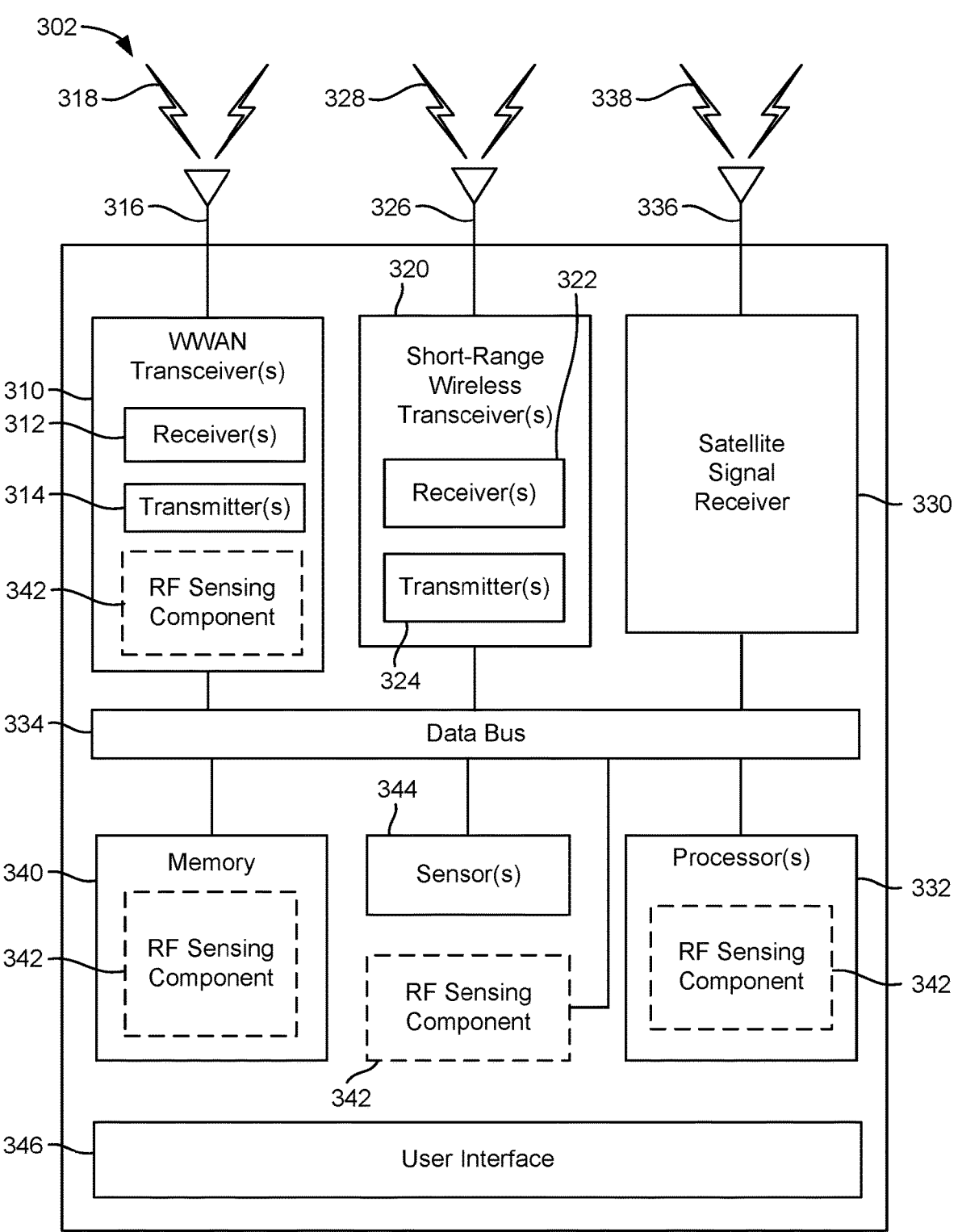
FIGS. 3A, 3B, and 3C are simplified block diagrams of several sample aspects of components that may be employed in a user equipment (UE), a base station, and a network entity, respectively, and configured to support communications as taught herein.
Figure 3B:
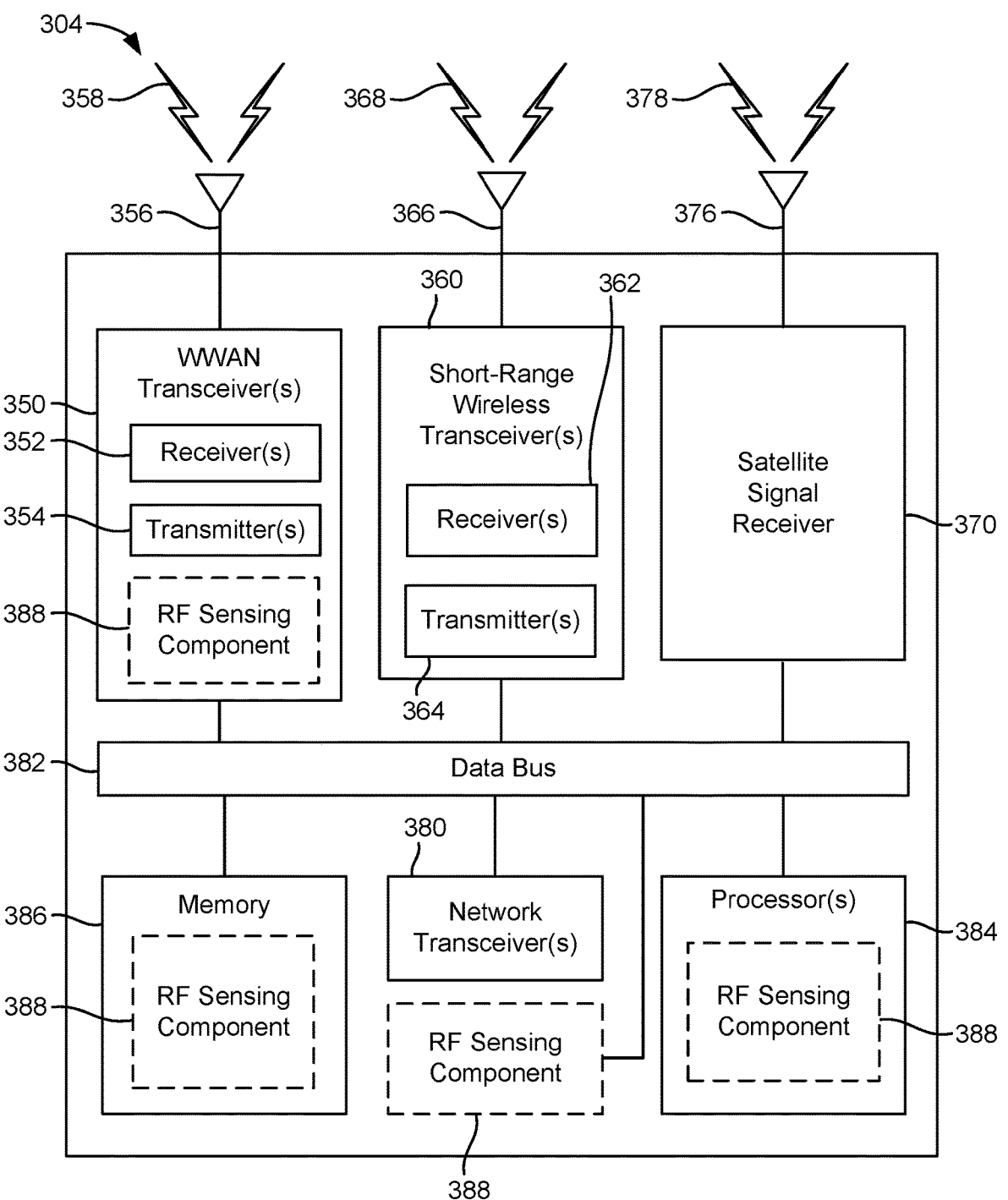
Figure 3C:
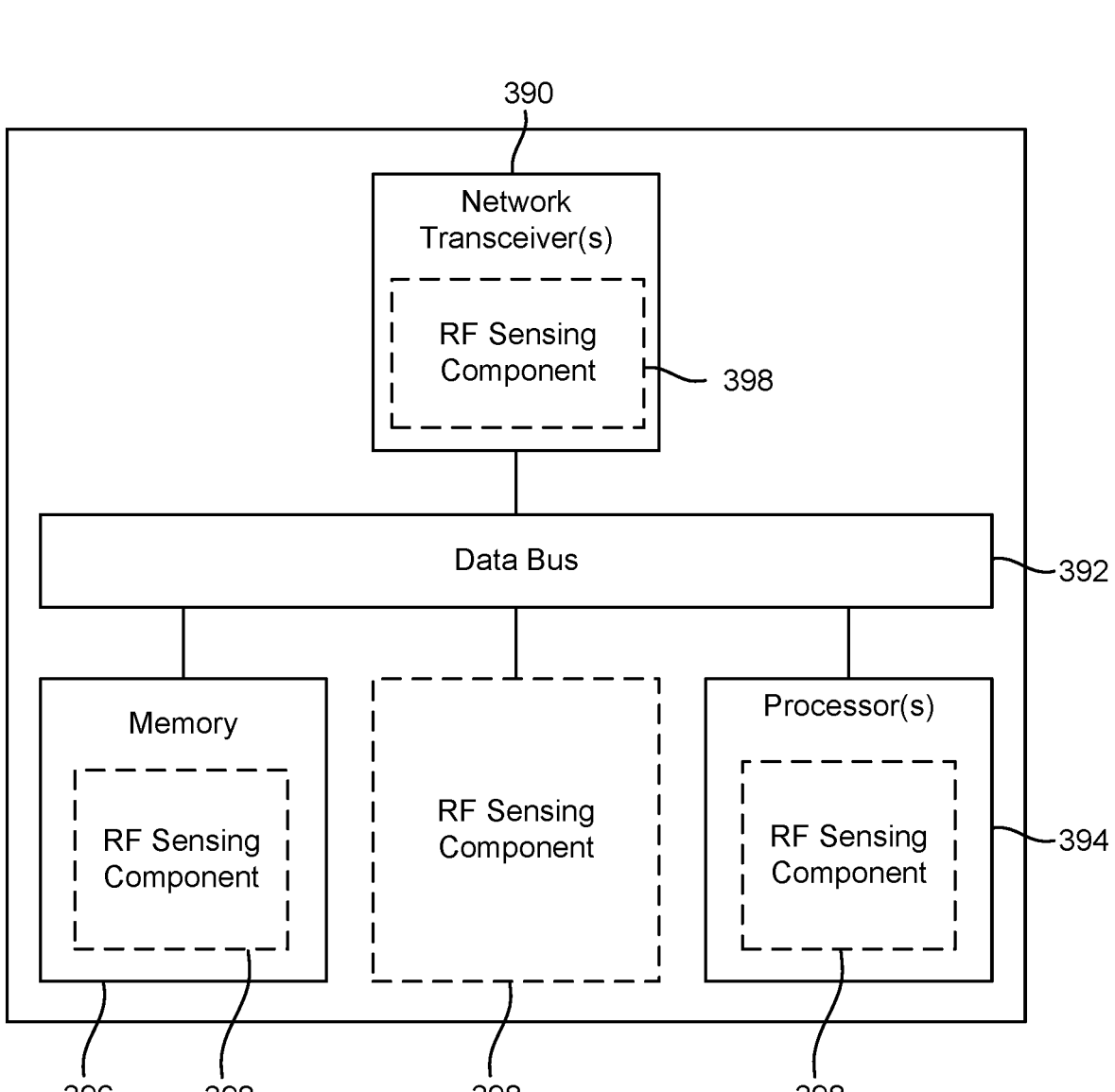

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, which permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, which permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include RF sensing component 342, 388, and 398, respectively. The RF sensing component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the RF sensing component 342, 388, and 398 may be external to the processors 332, 384, and 394 (e.g., part of a modem processing system, integrated with another processing system, etc.). Alternatively, the RF sensing component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the RF sensing component 342, which may be, for example, part of the one or more WWAN transceivers 310, the memory 340, the one or more processors 332, or any combination thereof, or may be a standalone component. FIG. 3B illustrates possible locations of the RF sensing component 388, which may be, for example, part of the one or more WWAN transceivers 350, the memory 386, the one or more processors 384, or any combination thereof, or may be a standalone component. FIG. 3C illustrates possible locations of the RF sensing component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the RF sensing component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
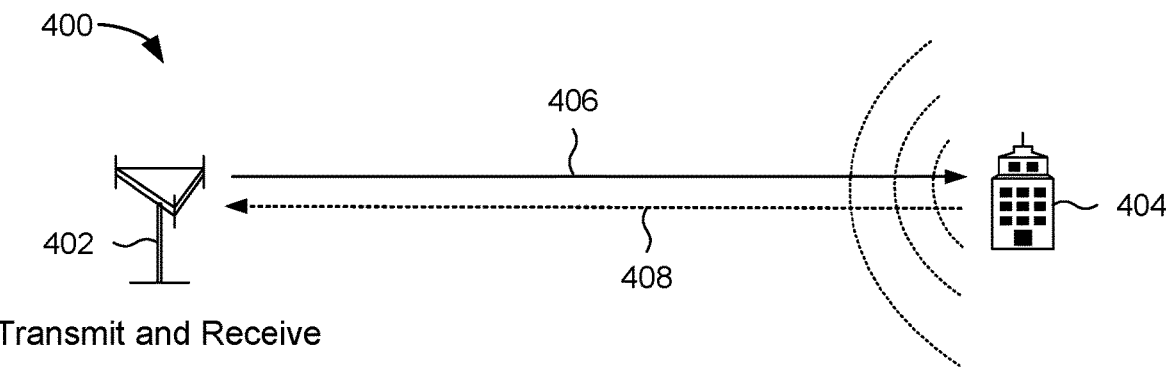
FIG. 4A illustrates an example monostatic radar system.
Figure 4B:
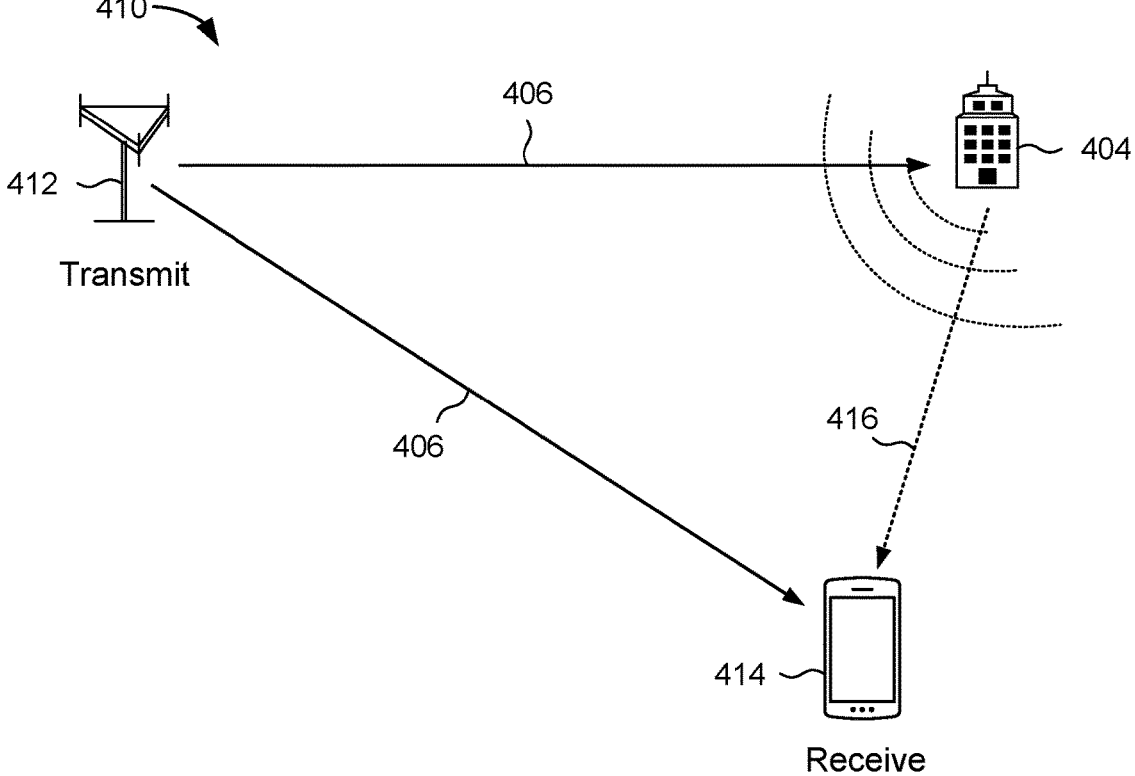
FIG. 4B illustrates an example bistatic radar system.

FIGS. 4A and 4B illustrate two of these various types of radar. In general, there are different types of radar, and in particular, monostatic and bistatic radars. Specifically, FIG. 4A is a diagram 400 illustrating a monostatic radar scenario, and FIG. 4B is a diagram 410 illustrating a bistatic radar scenario.

In FIG. 4A, a base station 402 may be configured for full duplex operation and thus the transmitter (Tx) and receiver (Rx) are co-located. For example, a transmitted radio signal 406 may be reflected off of a target object, such as a building 404, and the receiver on the base station 402 is configured to receive and measure a reflected beam 408. This is a typical use case for traditional, or conventional, radar.

In FIG. 4B, a base station 412 may be configured as a transmitter (Tx) and a UE 414 may be configured as a receiver (Rx). In this example, the transmitter and the receiver are not co-located, that is, they are separated, e.g., by a distance that is comparable to the expected target distance. The base station 412 may be configured to transmit a beam, such as an omnidirectional downlink RF signal 406 which may be received by the UE 414. A portion of the RF signal 406 may be reflected or refracted by the building 404 and the UE 414 may receive this reflected signal 416. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 412 and the receiver is the UE 414, whereas in an uplink scenario, the transmitter is a UE and the receiver is a base station. A multistatic radar system is a generalization of the bistatic radar system, which includes at least three components, e.g., one receiver and two transmitters, two receivers and one transmitter, or multiple receivers and multiple transmitters.

Referring to FIG. 4B in greater detail, the base station 412 transmits RF sensing signals (e.g., PRS) to the UE 414, but some of the RF sensing signals reflect off a target object such as the building 404. The UE 414 can measure the ToAs of the RF signal 406 received directly from the base station, and the ToAs of the reflected signal 416 which is reflected from the target object (e.g., the building 404).

The base station 412 may be configured to transmit the single RF signal 406 or multiple RF signals to a receiver (e.g., the UE 414). However, the UE 414 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 412 and the UE 414, and the reflected signal 416 represents the RF sensing signals that followed a NLOS path between the base station 412 and the UE 414 due to reflecting off the building 404 (or another target object). The base station 412 may have transmitted multiple RF sensing signals (not shown in FIG. 4B), some of which followed the LOS path and others of which followed the NLOS path. Alternatively, the base station 412 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 414 can determine the distance to the building 404. In addition, if the UE 414 is capable of receive beamforming, the UE 414 may be able to determine the general direction to the building 404 as the direction of the reflected signal 416, which is the RF sensing signal following the NLOS path as received. The UE 414 may then optionally report this information to the transmitting base station 412, an application server associated with the core network, an external client, a third-party application, or some other entity. Alternatively, the UE 414 may report the ToA measurements to the base station 412, or other entity, and the base station 412 may determine the distance and, optionally, the direction to the target object.

Note that if the RF sensing signals are uplink RF signals transmitted by the UE 414 to the base station 412, the base station 412 would perform object detection based on the uplink RF signals just like the UE 414 does based on the downlink RF signals.

Figure 5:
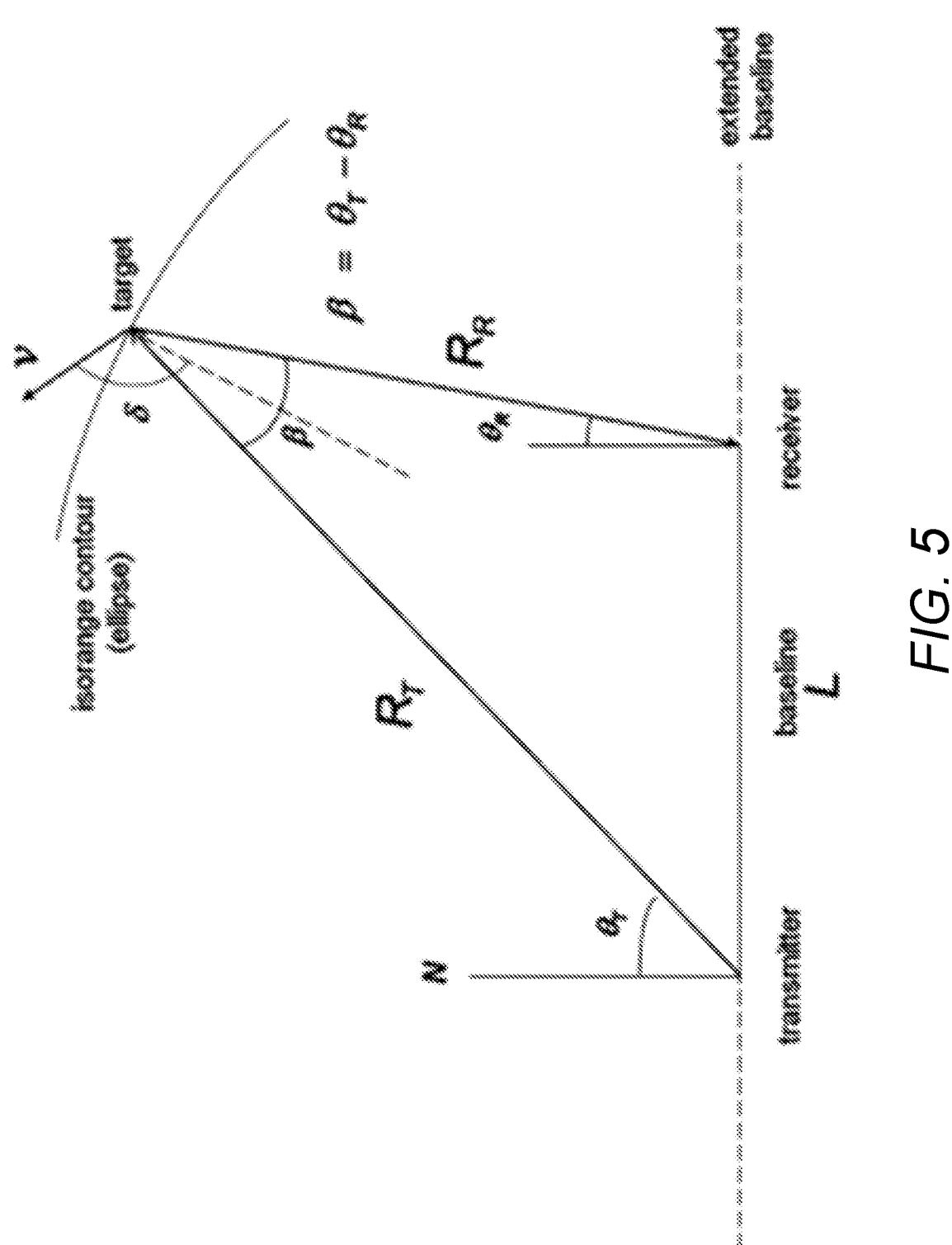
FIG. 5 illustrates example range calculations using bistatic or multistatic radar.

FIG. 5 illustrates example range calculations using bistatic or multistatic radar. The distance from transmitter to target to receiver, referred to herein as the Tx-target-Rx range, is measured by a bistatic radar as $R_{SUM}=R_T+R_R$. The range $R_{SUM}$ locates the target on the surface of an ellipsoid whose foci are the radar transmitter side and the radar receiver site. The time interval between the reception of the line of sight (LOS) signal transmitted by the transmitter and reception to the target echo can be used to measure the range sum $R_{SUM}$:

$$R_{sum}=T_{Tx\_echo}-T_{Rx_{LOS}})*c+L$$

where L is the baseline distance between the transmitter and the receiver. The target range from the perspective of the receiver can be computed as:

$$R = \frac{R_{sum}^2 - L^2}{2(R_{sum} + L*\sin\theta_R)}$$

The target angle of arrival (AoA) angle $\theta_R$ can be estimated by the antenna array at the receiver. For multistatic radar, the angle $\theta_R$ can be estimated through multilateration. For a stationary transmitter and receiver, the target bistatic Doppler frequency is given by:

$$f_D = \frac{2v}{c}*\cos\delta*\cos(\beta/2)$$

Due to larger and larger bandwidth (BW) allocated for cellular communications systems (e.g., for 5G and beyond) and more use cases for a cellular communications system are being introduced, joint communication and RF sensing (JCS) has become a desirable feature for future cellular systems. Because spectrum resources are always scarce, it is desirable for JCS to have high spectrum efficiency, and dedicating slots or sub-slots for RF sensing is not an efficient use of the spectrum from a communications or JCS perspective. Moreover, while it is desirable to use the same waveforms for both communications and sensing, the different requirements for communication and sensing make this goal challenging to attain. For example, the beam for communications and the beam for sensing may be quite different. Another example is that communication signal may not require high resolution velocity estimation but sensing signal may need to support high resolution velocity estimation.

To overcome the technical challenges just described, techniques for opportunistic RF sensing in cellular systems are herein presented. The following techniques achieve high spectrum efficiency JCS. These techniques take advantage of opportunities for transmitting and receiving sensing reference signals in a manner that does not impact the operation of the UE and thus does not reduce spectrum efficiency compared to baseline cellular systems. These techniques include RF sensing during a guard period, RF sensing during a BWP switch, and RF sensing during a beam switch.

RF Sensing During a Guard Period

Figure 6:
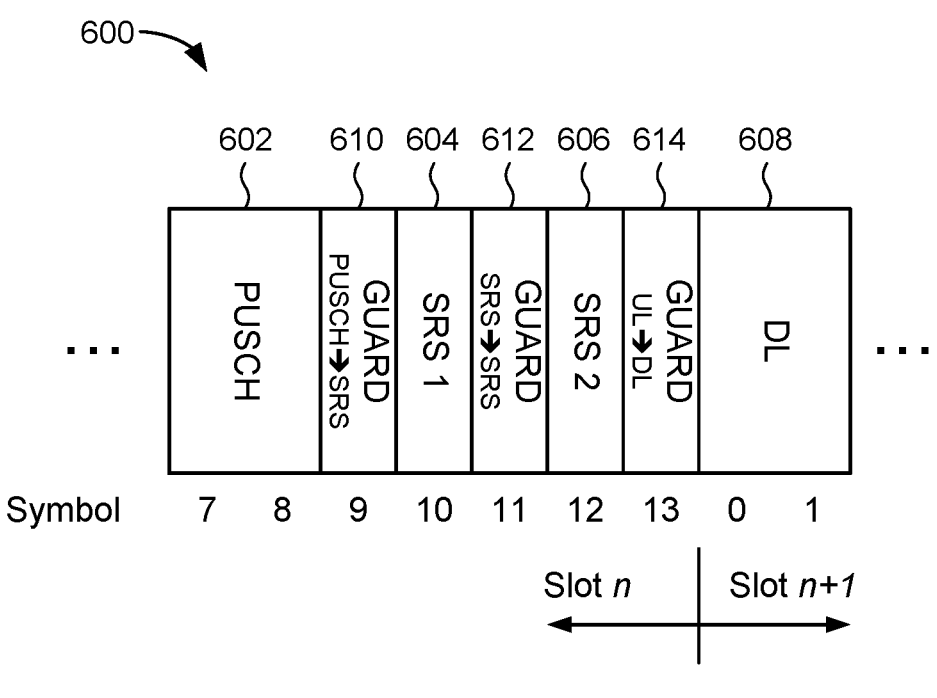
FIG. 6 is a time and frequency diagram showing example guard periods, during which a UE does not transmit any other signal.

FIG. 6 is a time and frequency diagram 600 showing example guard periods, during which a UE does not transmit any other signal. FIG. 6 shows the last seven symbols of a slot n and the first two symbols of the next slot n+1. In NR Rel-15/16, a UE can be configured with up to two SRS resource sets for antenna switching. In the example shown in FIG. 6, a PUSCH 602 occupies symbols 7 and 8 of slot n, a first SRS 604 occupies symbol 10 of slot n, a second SRS 606 occupies symbol 12 of slot n, and the first two symbols of slot n+1 are downlink (DL) slots 608. FIG. 6 illustrates three types of guard periods used when switching to or from SRS and other channels:

A guard period 610 is used before an SRS when there is a PUSCH transmission from the same UE before the SRS;

A guard period 612 is used between SRS resources of the set transmitted in the same slot, and is 2 symbols in length for 120 kHz subcarrier spacing, and 1 symbol in length otherwise; and A guard period 614 is used after the last SRS resource, for switching from UL to DL.

Since a UE is not expected to transmit UL signals or receive the DL signals during these guard periods, these guard periods are opportunities during which a base station can transmit an RF sensing signal. If the RF sensing is monostatic and the RF sensing transmitter and receiver are the base station, then the sensing reference signals are transparent to the UE, and the UE is not aware of any sensing activity. If the RF sensing is bistatic or multistatic, the serving base station may need to signal the time and frequency information of the guard period to the non-serving base station, which may be done through X2 signaling between the base stations. The serving and non-serving base stations can be either the sensing transmitter or the sensing receiver. In some aspects, the serving base station may send assistance data to a radar server, which then allocates the opportunistic sensing reference signal transmission and reception for a group of base stations, e.g., both serving and non-serving base stations.

RF Sensing During a BWP Switch

Figure 7:
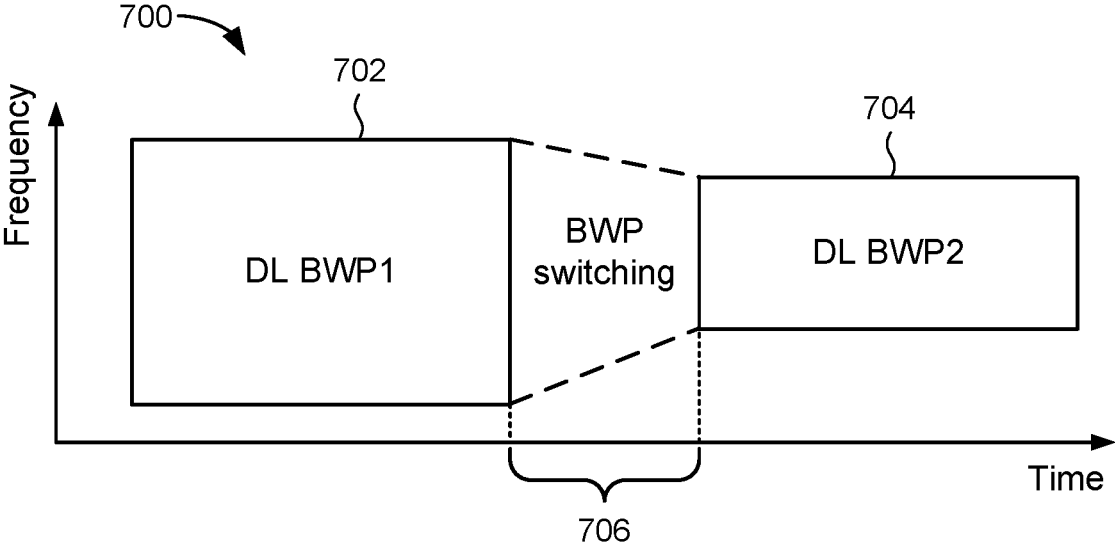
FIG. 7 is a time and frequency diagram 700 showing an example BWP switch period, during which a UE does not transmit any other signal.

FIG. 7 is a time and frequency diagram 700 showing an example BWP switch period, during which a UE does not transmit any other signal. In FIG. 7, a UE is switching from a first DL BWP 702 to a second DL BWP 704. The current spec for changing a BWP includes a switching delay defined 706 as a number of slots according to the table below:

TABLE 1

| BWP switch delay in slots | | | |
|---|---|---|---|
| NR slot length | | BWP switch delay $T_{BWPswitchDelay}$ (slots) | |
| μ | (ms) | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch This switching delay causes lower spectrum efficiency.

In some aspects of the present disclosure, the UE could be configured with multiple BWP (current standards support up to four DL/UL BWPs in downlink), and BWP switching could be achieved through:

PDCCH (i.e., DCI): a specific BWP can be activated by a BWP indicator in DCI Format 0_1 (a UL Grant) and DCI Format 1_1 (a DL Schedule);

A BWP inactivity timer, such as ServingCellConfig.bwp-InactivityTimer;

RRC signaling;

The MAC entity itself upon initiation of a RACH procedure.

Hence, the serving base station would be aware of when the UE is performing BWP switching, and in some aspects the base station can transmit or receive an RF sensing signal during BWP switching of one UE or a group of UEs. The RF sensing signal is transparent to the UE, and the UE is not aware of any sensing activity. If the RF sensing is bistatic or multistatic, the serving base station may need to signal the time and frequency information of the BWP switching to the non-serving base station, which may be done through X2 signaling between the base stations. The serving and non-serving base stations can be either the sensing transmitter or the sensing receiver. In some aspects, the serving base station may send assistance data to a radar server, which then allocates the opportunistic sensing reference signal transmission and reception for a group of base stations, e.g., both serving and non-serving base stations.

RF Sensing During a Beam Switch

Figure 8:
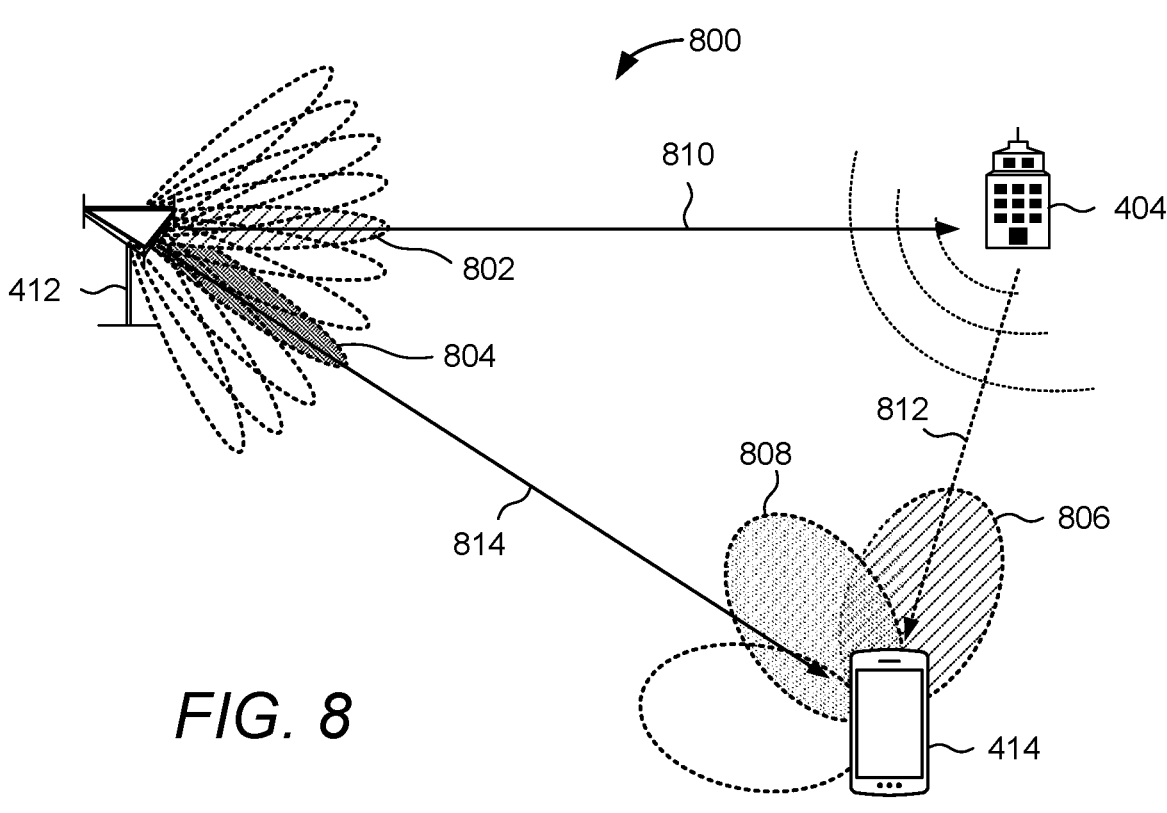
FIG. 8 illustrates an example of beam switching by a base station and a UE, during which a UE does not transmit any other signal

FIG. 8 illustrates an example 800 of beam switching by a base station 412 and a UE 414. during which a UE does not transmit any other signal. In the example illustrated in FIG. 8, the base station 412 and the UE 414 are in the presence of a reflecting obstacle, e.g., building 404. The base station 412, such as a 5G NR gNB, is configured to transmit a plurality of beamformed signals along different azimuths, elevations, and/or beam widths, such as a first transmit beam 802 and a second transmit beam 804 in FIG. 8. For example, the beams transmitted by the base station 412 may be based on SS Blocks, CSI-RS, TRS, or PRS resource sets. Other sensing and tracking reference signals may also be used. The UE 414 is configured to utilize receive beamforming to improve the gain of signals based on the angle of arrival. The UE 414 may be configured to utilize phase shifters and other software and hardware techniques to generate receive beams, such as a first receive beam 806 and a second receive beam 808. The UE 414 may also be configured to utilize beam forming for transmitted beams. The base station 412 may transmit a first reference signal 810 on a first transmit beam 802 in the direction of a target object, such as the building 404, which may be reflected and the UE 414 may receive a reflected signal 812 with the first receive beam 806. The reflected signal 812 represents a NLOS path of the first reference signal 810 to the UE 414. The base station 412 also transmits a second reference signal 814 on a second beam 804. In an example, the second reference signal 814 may be quasi co-located (QCLed) with the first reference signal 810. The UE 414 receives the second reference signal 814 with the second receive beam 808. The second reference signal 814 is a LOS path to the UE 414. In the example illustrated in FIG. 8, the UE 414 has to change its phase shifters and other hardware or software to change its receive beam, e.g., to change from the first receive beam 806 to the second receive beam 808. During this change, the UE 414 does not transmit any signals. This is yet another opportunity for the base station to perform RF sensing.

Thus, in some aspects, when one UE or a group of UEs perform beam switching, a base station transmits and/or receives an RF sensing signal during the beam switching gap. In some aspects, the beam switch gap is defined with a table in the specification for UE beam switch gaps, in which case the UE may indicate the index of switch duration being used. In some aspects, the UE may signal an expected or maximum switch duration for a specific switch; in some aspects, the UE may signal a planned time or instance for beam switching, e.g., by specifying a system frame number (SFN), slot index, symbol index, etc. The RF sensing signal is transparent to the UE, and the UE is not aware of any sensing activity. If the RF sensing is bistatic or multistatic, the serving base station may need to signal the time and frequency information of the beam switching gap to the non-serving base station, which may be done through X2 signaling between the base stations. The serving and non-serving base stations can be either the sensing transmitter or the sensing receiver. In some aspects, the serving base station may send assistance data to a radar server, which then allocates the opportunistic sensing reference signal transmission and reception for a group of base stations, e.g., both serving and non-serving base stations.

Figure 9:
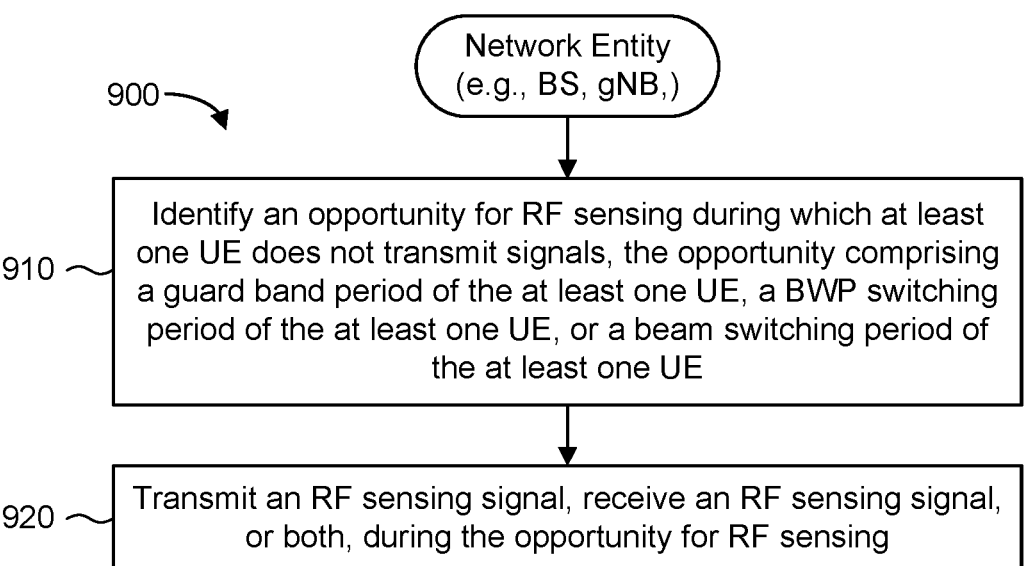
FIG. 9 is a flowchart of an example process, performed by a base station or other network entity, associated with opportunistic RF sensing in cellular systems.

FIG. 9 is a flowchart of an example process 900 associated with opportunistic RF sensing in cellular systems. In some implementations, one or more process blocks of FIG. 9 may be performed by network entity, such as a base station (BS) (e.g., BS 102, a gNB, etc.). In some implementations, one or more process blocks of FIG. 9 may be performed by another device or a group of devices separate from or including the network entity. Additionally, or alternatively, one or more process blocks of FIG. 9 may be performed by one or more components of BS 304, such as processor(s) 384, memory 386, WWAN transceiver(s) 350, short-range wireless transceiver(s) 360, satellite signal receiver 370, network transceiver(s) 380, and RF sensing component(s) 388, any or all of which may be means for performing the operations of process 900.

As shown in FIG. 9, process 900 may include identifying an opportunity for radio frequency (RF) sensing during which a user equipment (UE) does not transmit signals, the opportunity comprising a guard period of the UE, a bandwidth part (BWP) switching period of the UE, or a beam switching period of the UE (block 910). Means for performing the operation of block 910 may include the processor(s) 384, memory 386, or WWAN transceiver(s) 350 of the BS

27

304. For example, the BS 304 may identify an opportunity for RF sensing, using the processor(s) 384.

In some aspects, identifying the opportunity for RF sensing comprises identifying a guard period of the UE, wherein the guard period is associated with sounding reference signals (SRSs) transmitted by the UE. In some aspects, identifying the guard period of the UE comprises identifying a guard period used before transmission of an SRS by the UE after a transmission of a physical uplink shared channel (PUSCH) by the UE. In some aspects, identifying the guard period of the UE comprises identifying a guard period used between SRSs transmitted in a same slot. In some aspects, identifying the guard period of the UE comprises identifying a guard period used after a last SRS transmitted in a slot and before the UE switches from an uplink transmission to a downlink transmission.

In some aspects, identifying the opportunity for RF sensing comprises identifying a BWP switching period of the UE. In some aspects, identifying the BWP switching period of the UE comprises identifying a switching delay during which the UE switches from a first BWP to a second BWP. In some aspects, identifying the BWP switching period of the UE comprises identifying the BWP switching period based on at least one of a BWP indicator in a downlink control information (DCI) message to the UE, a BWP inactivity timer associated with the UE, radio resource control (RRC) signaling involving the UE, or a media access control (MAC) entity upon initiation of a random access (RACH) procedure.

In some aspects, identifying the opportunity for RF sensing comprises identifying a beam switching period of the UE. In some aspects, identifying the beam switching period of the UE comprises receiving an indication of the beam switching period from the UE. In some aspects, receiving the indication of the beam switching period from the UE comprises receiving a beam switch gap location identified by a system frame number (SFN), a slot index, a symbol index, a switch duration, or a combination thereof. In some aspects, receiving the beam switch gap location comprises receiving an index into a predefined table of beam switch gap locations, a maximum switch duration for a specific beam switch gap location, or a combination thereof.

As further shown in FIG. 9, process 900 may include transmitting an RF sensing signal, receiving an RF sensing signal, or both, during the opportunity for RF sensing (block 920). Means for performing the operation of block 920 may include the processor(s) 384, memory 386, or WWAN transceiver(s) 350 of the BS 304. For example, the BS 304 may transmit an RF sensing signal using the transmitter(s) 354 and receive an RF sensing signal using the receiver(s) 352.

Process 900 may include additional implementations, such as any single implementation or any combination of implementations described below and/or in connection with one or more other processes described elsewhere herein. Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
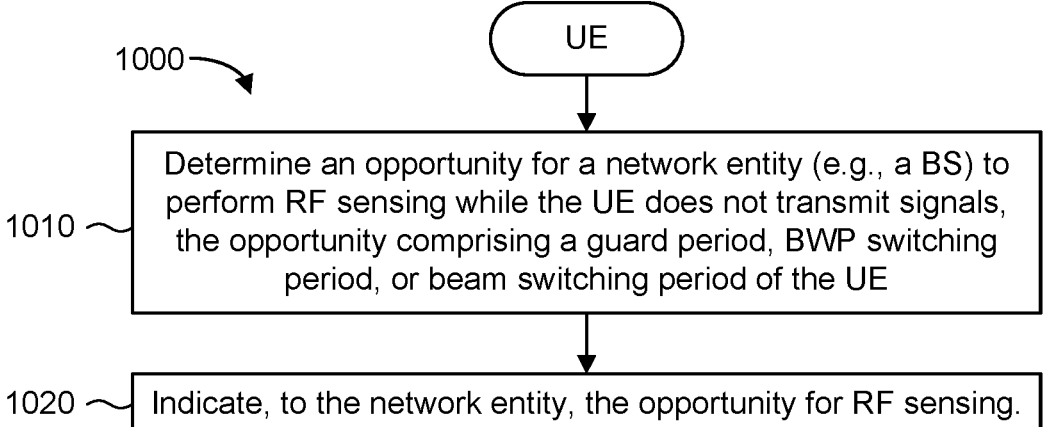
FIG. 10 is a flowchart of an example process, performed by a UE, associated with opportunistic RF sensing in cellular systems.

FIG. 10 is a flowchart of an example process 1000 associated with opportunistic RF sensing in cellular systems. In some implementations, one or more process blocks of FIG. 10 may be performed by a user equipment (UE) (e.g., UE 104). In some implementations, one or more process blocks of FIG. 10 may be performed by another device or a group of devices separate from or including the UE. Additionally, or alternatively, one or more process blocks of FIG. 10 may be performed by one or more components of UE 302, such as processor(s) 332, memory 340, WWAN transceiver(s) 310, short-range wireless transceiver(s) 320, satellite signal receiver 330, sensor(s) 344, user interface 346, and RF sensing component(s) 342, any or all of which may be means for performing the operations of process 1000.

As shown in FIG. 10, process 1000 may include determining an opportunity for a network entity, such as a base station, to perform RF sensing while the UE does not transmit signals, the opportunity comprising a guard period of the UE, a BWP switching period of the UE, or a beam switching period of the UE (block 1010). Means for performing the operation of block 1010 may include the processor(s) 332, memory 340, or WWAN transceiver(s) 310 of the UE 302. For example, the UE 302 may determine an opportunity for the network entity to perform the RF sensing, using the processor(s) 332.

As further shown in FIG. 10, process 1000 may include indicating, to the network entity, the opportunity for RF sensing (block 1020). Means for performing the operation of block 1020 may include the processor(s) 332, memory 340, or WWAN transceiver(s) 310 of the UE 302. For example, the UE 302 may send the indication using the transmitter(s) 314.

In some aspects, indicating the opportunity for RF sensing comprises indicating a BWP switching period of the UE. In some aspects, indicating the BWP switching period of the UE comprises indicating a switching delay during which the UE switches from a first BWP to a second BWP. In some aspects, indicating the BWP switching period of the UE comprises indicating the BWP switching period based on at least one of radio resource control (RRC) signaling involving the UE, or a media access control (MAC) entity upon initiation of a random access (RACH) procedure.

In some aspects, indicating the opportunity for RF sensing comprises indicating a beam switching period of the UE. In some aspects, indicating the beam switching period of the UE comprises sending an indication of the beam switching period. In some aspects, sending the indication of the beam switching period comprises sending a beam switch gap location identified by a system frame number (SFN), a slot index, a symbol index, a switch duration, or a combination thereof. In some aspects, sending the beam switch gap location comprises sending an index into a predefined table of beam switch gap locations, a maximum switch duration for a specific beam switch gap location, or a combination thereof.

Process 1000 may include additional implementations, such as any single implementation or any combination of implementations described below and/or in connection with one or more other processes described elsewhere herein. Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

As will be appreciated, a technical advantage of the methods described herein is that, by taking advantage of existing periods during which a UE already does not transmit or receive, a base station can opportunistically perform RF sensing in a manner that does not require any change in behavior on the part of the UE, and thus does not have a negative impact on spectrum efficiency.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of RF sensing performed by a network entity, the method comprising: identifying an opportunity for radio frequency (RF) sensing during which a user equipment (UE) does not transmit signals, the opportunity comprising a guard period of the UE, a bandwidth part (BWP) switching period of the UE, or a beam switching period of the UE; and transmitting an RF sensing signal, receiving an RF sensing signal, or both, during the opportunity for RF sensing.

Clause 2. The method of clause 1, where identifying the opportunity for RF sensing comprises identifying a guard period of the UE, wherein the guard period is associated with sounding reference signals (SRSs) transmitted by the UE.

Clause 3. The method of clause 2, wherein identifying the guard period of the UE comprises identifying a guard period used before transmission of an SRS by the UE after a transmission of a physical uplink shared channel (PUSCH) by the UE.

Clause 4. The method of any of clauses 2 to 3, wherein identifying the guard period of the UE comprises identifying a guard period used between SRSs transmitted in a same slot.

Clause 5. The method of any of clauses 2 to 4, wherein identifying the guard period of the UE comprises identifying a guard period used after a last SRS transmitted in a slot and before the UE switches from an uplink transmission to a downlink transmission.

Clause 6. The method of any of clauses 1 to 5, wherein identifying the opportunity for RF sensing comprises identifying a BWP switching period of the UE.

Clause 7. The method of clause 6, wherein identifying the BWP switching period of the UE comprises identifying a switching delay during which the UE switches from a first BWP to a second BWP.

Clause 8. The method of any of clauses 6 to 7, wherein identifying the BWP switching period of the UE comprises identifying the BWP switching period based on at least one of: a BWP indicator in a downlink control information (DCI)

message to the UE; a BWP inactivity timer associated with the UE; radio resource control (RRC) signaling involving the UE; or a media access control (MAC) entity upon initiation of a random access (RACH) procedure.

Clause 9. The method of any of clauses 1 to 8, wherein identifying the opportunity for RF sensing comprises identifying a beam switching period of the UE.

Clause 10. The method of clause 9, wherein identifying the beam switching period of the UE comprises receiving an indication of the beam switching period from the UE.

Clause 11. The method of clause 10, wherein receiving the indication of the beam switching period from the UE comprises receiving a beam switch gap location identified by a system frame number (SFN), a slot index, a symbol index, a switch duration, or a combination thereof.

Clause 12. The method of clause 11, wherein receiving the beam switch gap location comprises receiving an index into a predefined table of beam switch gap locations, a maximum switch duration for a specific beam switch gap location, or a combination thereof.

Clause 13. A method of RF sensing performed by a UE, the method comprising: determining an opportunity for a network entity to perform RF sensing while the UE does not transmit signals, the opportunity comprising a guard period of the UE, a BWP switching period of the UE, or a beam switching period of the UE; and indicating, to the network entity, the opportunity for RF sensing.

Clause 14. The method of clause 13, wherein indicating the opportunity for RF sensing comprises indicating a BWP switching period of the UE.

Clause 15. The method of clause 14, wherein indicating the BWP switching period of the UE comprises indicating a switching delay during which the UE switches from a first BWP to a second BWP.

Clause 16. The method of any of clauses 14 to 15, wherein indicating the BWP switching period of the UE comprises indicating the BWP switching period based on at least one of: RRC signaling involving the UE; or a MAC entity upon initiation of a RACH procedure.

Clause 17. The method of any of clauses 13 to 16, wherein indicating the opportunity for RF sensing comprises indicating a beam switching period of the UE.

Clause 18. The method of clause 17, wherein indicating the beam switching period of the UE comprises sending an indication of the beam switching period.

Clause 19. The method of clause 18, wherein sending the indication of the beam switching period comprises sending a beam switch gap location identified by an SFN, a slot index, a symbol index, a switch duration, or a combination thereof.

Clause 20. The method of clause 19, wherein sending the beam switch gap location comprises sending an index into a predefined table of beam switch gap locations, a maximum switch duration for a specific beam switch gap location, or a combination thereof.

Clause 21. A network entity, comprising: a memory; at least one transceiver; and at least one processor communicatively coupled to the memory and the at least one transceiver, the at least one processor configured to: identify an opportunity for RF sensing during which a UE does not transmit signals, the opportunity comprising a guard period of the UE, a BWP switching period of the UE, or a beam switching period of the UE; and transmit, via the at least one transceiver, an RF sensing signal, receiving an RF sensing signal, or both, during the opportunity for RF sensing.

Clause 22. The network entity of clause 21, wherein, to identify the opportunity for RF sensing, the at least one processor is configured to identify a guard period of the UE, wherein the guard period is associated with SRSs transmitted by the UE.

Clause 23. The network entity of clause 22, wherein, to identify the guard period of the UE, the at least one processor is configured to identify a guard period used before transmission of an SRS by the UE after a transmission of a PUSCH by the UE.

Clause 24. The network entity of any of clauses 22 to 23, wherein, to identify the guard period of the UE, the at least one processor is configured to identify a guard period used between SRSs transmitted in a same slot.

Clause 25. The network entity of any of clauses 22 to 24, wherein, to identify the guard period of the UE, the at least one processor is configured to identify a guard period used after a last SRS transmitted in a slot and before the UE switches from an uplink transmission to a downlink transmission.

Clause 26. The network entity of any of clauses 21 to 25, wherein, to identify the opportunity for RF sensing, the at least one processor is configured to identify a BWP switching period of the UE.

Clause 27. The network entity of clause 26, wherein, to identify the BWP switching period of the UE, the at least one processor is configured to identify a switching delay during which the UE switches from a first BWP to a second BWP.

Clause 28. The network entity of any of clauses 26 to 27, wherein, to identify the BWP switching period of the UE, the at least one processor is configured to identify the BWP switching period based on at least one of: a BWP indicator in a DCI message to the UE; a BWP inactivity timer associated with the UE; RRC signaling involving the UE; or a MAC entity upon initiation of a RACH procedure.

Clause 29. The network entity of any of clauses 21 to 28, wherein, to identify the opportunity for RF sensing, the at least one processor is configured to identify a beam switching period of the UE.

Clause 30. The network entity of clause 29, wherein, to identify the beam switching period of the UE, the at least one processor is configured to receive an indication of the beam switching period from the UE.

Clause 31. The network entity of clause 30, wherein, to receive the indication of the beam switching period from the UE, the at least one processor is configured to receive a beam switch gap location identified by a SFN, a slot index, a symbol index, a switch duration, or a combination thereof.

Clause 32. The network entity of clause 31, wherein, to receive the beam switch gap location, the at least one processor is configured to receive an index into a predefined table of beam switch gap locations, a maximum switch duration for a specific beam switch gap location, or a combination thereof.

Clause 33. A UE, comprising: a memory; at least one transceiver; and at least one processor communicatively coupled to the memory and the at least one transceiver, the at least one processor configured to: determine an opportunity for a network entity, such as a base station, to perform RF sensing while the UE does not transmit signals, the opportunity comprising a guard period of the UE, a BWP switching period of the UE, or a beam switching period of the UE; and indicate, to the network entity via the at least one transceiver, the opportunity for RF sensing.

Clause 34. The UE of clause 33, wherein, to indicate the opportunity for RF sensing, the at least one processor is configured to indicate a BWP switching period of the UE.

Clause 35. The UE of clause 34, wherein, to indicate the BWP switching period of the UE, the at least one processor is configured to indicate a switching delay during which the UE switches from a first BWP to a second BWP.

Clause 36. The UE of any of clauses 34 to 35, wherein, to indicate the BWP switching period of the UE, the at least one processor is configured to indicate the BWP switching period based on at least one of: RRC signaling involving the UE; or a MAC entity upon initiation of a RACH procedure.

Clause 37. The UE of any of clauses 33 to 36, wherein, to indicate the opportunity for RF sensing, the at least one processor is configured to indicate a beam switching period of the UE.

Clause 38. The UE of clause 37, wherein, to indicate the beam switching period of the UE, the at least one processor is configured to send an indication of the beam switching period.

Clause 39. The UE of clause 38, wherein, to send the indication of the beam switching period, the at least one processor is configured to send a beam switch gap location identified by a SFN, a slot index, a symbol index, a switch duration, or a combination thereof.

Clause 40. The UE of clause 39, wherein, to send the beam switch gap location, the at least one processor is configured to send an index into a predefined table of beam switch gap locations, a maximum switch duration for a specific beam switch gap location, or a combination thereof.

Clause 41. A network entity, comprising: means for identifying an opportunity for RF sensing during which a UE does not transmit signals, the opportunity comprising a guard period of the UE, a BWP switching period of the UE, or a beam switching period of the UE; and means for transmitting an RF sensing signal, receiving an RF sensing signal, or both, during the opportunity for RF sensing.

Clause 42. A UE, comprising: means for determining an opportunity for a network entity to perform RF sensing while the UE does not transmit signals, the opportunity comprising a guard period of the UE, a BWP switching period of the UE, or a beam switching period of the UE; and means for indicating, to the network entity, the opportunity for RF sensing.

Clause 43. A non-transitory computer-readable medium storing computer-executable instructions that, when executed by a network entity, cause the network entity to: identify an opportunity for RF sensing during which a UE does not transmit signals, the opportunity comprising a guard period of the UE, a BWP switching period of the UE, or a beam switching period of the UE; and transmit an RF sensing signal, receiving an RF sensing signal, or both, during the opportunity for RF sensing.

Clause 44. A non-transitory computer-readable medium storing computer-executable instructions that, when executed by a UE, cause the UE to: determine an opportunity for a network entity to perform RF sensing while the UE does not transmit signals, the opportunity comprising a guard period of the UE, a BWP switching period of the UE, or a beam switching period of the UE; and indicate, to a network entity, the opportunity for RF sensing.

Clause 41. An apparatus comprising a memory, a transceiver, and a processor communicatively coupled to the memory and the transceiver, the memory, the transceiver, and the processor configured to perform a method according to any of clauses 1 to 20.

Clause 42. An apparatus comprising means for performing a method according to any of clauses 1 to 20.

Clause 43. A non-transitory computer-readable medium storing computer-executable instructions, the computer-executable comprising at least one instruction for causing a computer or processor to perform a method according to any of clauses 1 to 20.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of radio frequency (RF) sensing performed by a network entity, the method comprising:
  identifying an opportunity for RF sensing during which a user equipment (UE) does not transmit signals, the opportunity comprising a bandwidth part (BWP) switching period of the UE or a beam switching period of the UE; and
  transmitting an RF sensing signal, receiving an RF sensing signal, or both, during the opportunity for RF sensing.

2. The method of claim 1, wherein identifying the opportunity for RF sensing comprises identifying a BWP switching period of the UE.

3. The method of claim 2, wherein identifying the BWP switching period of the UE comprises identifying a switching delay during which the UE switches from a first BWP to a second BWP.

4. The method of claim 2, wherein identifying the BWP switching period of the UE comprises identifying the BWP switching period based on at least one of:
  a BWP indicator in a downlink control information (DCI) message to the UE;
  a BWP inactivity timer associated with the UE;
  radio resource control (RRC) signaling involving the UE; or
  a media access control (MAC) entity upon initiation of a random access (RACH) procedure.

5. The method of claim 1, wherein identifying the opportunity for RF sensing comprises identifying a beam switching period of the UE.

6. The method of claim 5, wherein identifying the beam switching period of the UE comprises receiving an indication of the beam switching period from the UE.

7. The method of claim 6, wherein receiving the indication of the beam switching period from the UE comprises receiving a beam switch gap location identified by a system frame number (SFN), a slot index, a symbol index, a switch duration, or a combination thereof.

8. The method of claim 7, wherein receiving the beam switch gap location comprises receiving an index into a predefined table of beam switch gap locations, a maximum switch duration for a specific beam switch gap location, or a combination thereof.

9. The method of claim 1, wherein the network entity comprises a base station or gNodeB.

10. A method of radio frequency (RF) sensing performed by a user equipment (UE), the method comprising:

determining an opportunity for a network entity to perform RF sensing while the UE does not transmit signals, the opportunity comprising a bandwidth part (BWP) switching period of the UE or a beam switching period of the UE; and indicating, to the network entity, the opportunity for RF sensing.

11. The method of claim 10, wherein indicating the opportunity for RF sensing comprises indicating a BWP switching period of the UE.

12. The method of claim 11, wherein indicating the BWP switching period of the UE comprises indicating a switching delay during which the UE switches from a first BWP to a second BWP.

13. The method of claim 11, wherein indicating the BWP switching period of the UE comprises indicating the BWP switching period based on at least one of:

radio resource control (RRC) signaling involving the UE; or a media access control (MAC) entity upon initiation of a random access (RACH) procedure.

14. The method of claim 10, wherein indicating the opportunity for RF sensing comprises indicating a beam switching period of the UE.

15. The method of claim 14, wherein indicating the beam switching period of the UE comprises sending an indication of the beam switching period.

16. The method of claim 15, wherein sending the indication of the beam switching period comprises sending a beam switch gap location identified by a system frame number (SFN), a slot index, a symbol index, a switch duration, or a combination thereof.

17. The method of claim 16, wherein sending the beam switch gap location comprises sending an index into a predefined table of beam switch gap locations, a maximum switch duration for a specific beam switch gap location, or a combination thereof.

18. The method of claim 10, wherein the network entity comprises a base station or a gNodeB.

19. A network entity, comprising:

a memory;

at least one transceiver; and at least one processor communicatively coupled to the memory and the at least one transceiver, the at least one processor configured to:

identify an opportunity for radio frequency (RF) sensing during which a user equipment (UE) does not transmit signals, the opportunity comprising a bandwidth part (BWP) switching period of the UE or a beam switching period of the UE; and transmit, via the at least one transceiver, an RF sensing signal, receiving an RF sensing signal, or both, during the opportunity for RF sensing.

20. The network entity of claim 19, wherein, to identify the opportunity for RF sensing, the at least one processor is configured to identify a BWP switching period of the UE.

21. The network entity of claim 19, wherein, to identify the opportunity for RF sensing, the at least one processor is configured to identify a beam switching period of the UE.

22. The network entity of claim 19, comprising a base station or gNodeB.

23. A user equipment (UE), comprising:

a memory;

at least one transceiver; and at least one processor communicatively coupled to the memory and the at least one transceiver, the at least one processor configured to:

determine an opportunity for a network entity to perform radio frequency (RF) sensing while the UE does not transmit signals, the opportunity comprising a bandwidth part (BWP) switching period of the UE or a beam switching period of the UE; and indicate, to the network entity via the at least one transceiver, the opportunity for RF sensing.

24. The UE of claim 23, wherein, to indicate the opportunity for RF sensing, the at least one processor is configured to indicate a BWP switching period of the UE.

25. The UE of claim 23, wherein, to indicate the opportunity for RF sensing, the at least one processor is configured to indicate a beam switching period of the UE.

* * * * *